(12) United States Patent
Hart et al.

(10) Patent No.: US 9,197,139 B2
(45) Date of Patent: Nov. 24, 2015

(54) RECTIFIER CHARGE RATE CONTROLLER

(71) Applicant: Control Techniques Limited, Newtown (GB)

(72) Inventors: Simon David Hart, Welshpool (GB); Stephen Berry, Newtown (GB)

(73) Assignee: CONTROL TECHNIQUES LIMITED, Newtown (GB)

( * ) Notice: Subject to any disclaimer, the term of this patent is extended or adjusted under 35 U.S.C. 154(b) by 62 days.

(21) Appl. No.: 14/091,775

(22) Filed: Nov. 27, 2013

(65) Prior Publication Data
US 2014/0153308 A1 Jun. 5, 2014

(30) Foreign Application Priority Data
Nov. 30, 2012 (GB) .................... 1221643.8

(51) Int. Cl.
*H02M 7/162* (2006.01)
*H02M 1/32* (2007.01)

(52) U.S. Cl.
CPC .............. *H02M 7/1626* (2013.01); *H02M 1/32* (2013.01)

(58) Field of Classification Search
USPC .......................... 363/52, 54, 81–94, 125–129
See application file for complete search history.

(56) References Cited

U.S. PATENT DOCUMENTS

| 4,291,265 | A | * | 9/1981 | Kawada et al. | ............... 318/782 |
| 4,757,436 | A | | 7/1988 | Ueda et al. | |
| 5,408,067 | A | * | 4/1995 | Crouse | .................... 219/137 PS |
| 2006/0238178 | A1 | * | 10/2006 | Agari et al. | .................... 323/268 |

* cited by examiner

Primary Examiner — Timothy J Dole
Assistant Examiner — Ishrat Jamali
(74) Attorney, Agent, or Firm — Harness, Dickey & Pierce, P.L.C.

(57) ABSTRACT

A rectifier circuit comprising an AC input, at least one thyristor coupled to the AC input, a DC bus driven by the at least one thyristor, a controller arranged to: derive a first current in the DC bus, derive a maximum current demand on the DC bus, and provide a trigger signal to the at least one thyristor based on the derived maximum current and the derived first current.

24 Claims, 5 Drawing Sheets

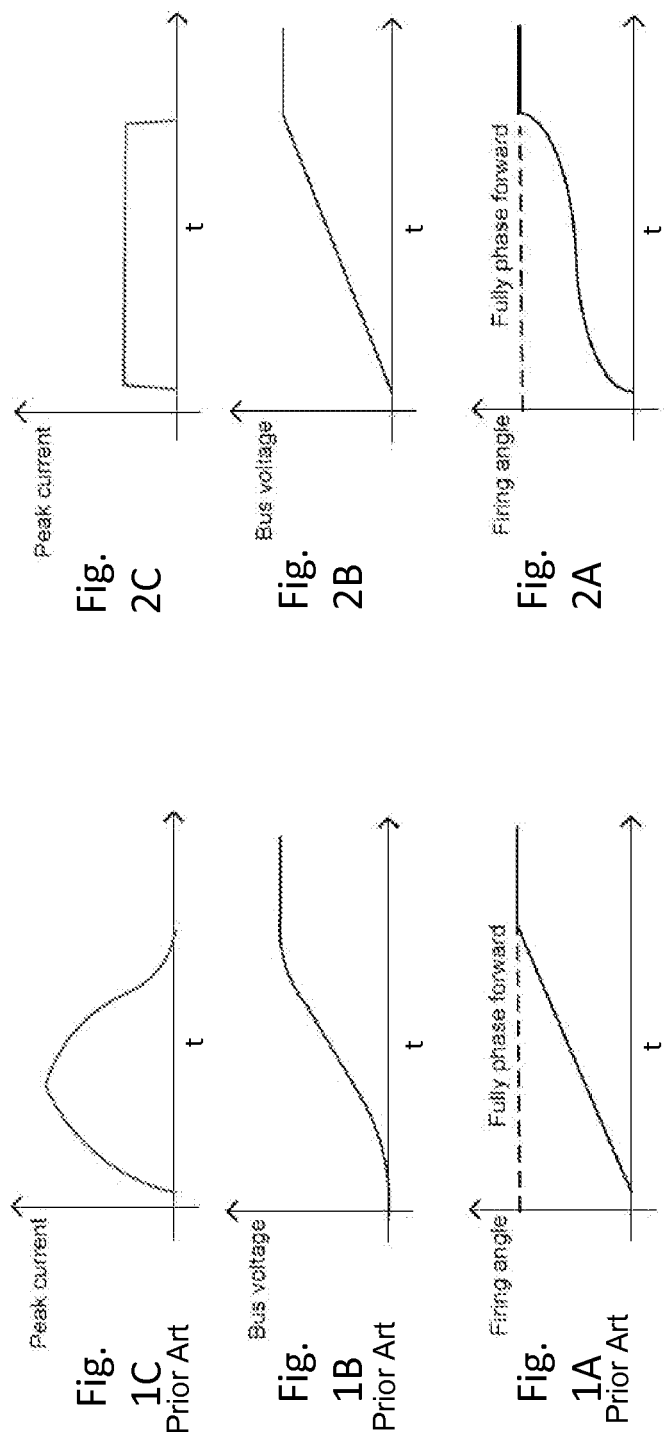

RECTIFIER CHARGE RATE CONTROLLER

CROSS-REFERENCE TO RELATED APPLICATION

This application claims the benefit and priority of Great Britain Patent Application No. 1221643.8 filed Nov. 30, 2012. The entire disclosure of the above application is incorporated herein by reference.

FIELD

This invention relates to a charge rate controller. It is particularly suitable for a rectifier charge rate controller, in particular the soft-start of the charging of a bus voltage.

BACKGROUND

Rectifiers are often used to provide a DC power supply from an AC source. In such applications, the rectifier elements often comprise thyristors to provide a soft-start of the rectifier circuit by regulating the DC output voltage during the initial DC voltage ramp-up. Typically, the thyristors are triggered according to the firing angle as illustrated in FIG. 1A. As can be seen, the firing angle of the thyristors is a linear progression in time. In other words, a constant increment is added to the firing angle from each zero-crossing of the phase of the input voltage until the DC bus is fully charged. As a result, the DC bus voltage (across the capacitance of the DC output) rises with an s-curve profile (FIG. 1B) as would be understood by the skilled person. Correspondingly, the current in the DC bus rises to a high peak and then falls as illustrated in FIG. 1C.

As a result, the various support components of the DC power supply in question must be sized according to the large current peak. This means, for example, that fuses must be rated above the high peak current value which requires more costly components. This can result in input fuses being rated at three times the rated output current of the DC power supply. Further, the DC power supply as a whole is subjected to a higher level of strain owing to the more extreme current conditions that are present during the charging of the DC bus.

It is therefore desirable to provide a soft-start of a DC bus that reduces the peak current during charging of the bus to a lower level whereby fuses and other components of the system can be rated at a lower value.

SUMMARY

According to a first aspect there is provided a rectifier circuit as defined in Claim 1 of the appended claims. Thus there is provided an AC input, at least one thyristor coupled to the AC input, the at least one thyristor arranged to drive a DC bus, and a controller arranged to derive a first current in the DC bus, derive a maximum current demand on the DC bus and provide a trigger signal to the at least one thyristor based on the derived maximum current and the derived first current.

Optionally, the trigger signal comprises a firing angle in relation to a voltage phase of the AC input.

Optionally the rectifier circuit comprises a plurality of thyristors coupled to the AC input and arranged to drive the DC bus and wherein the controller is arranged to provide a trigger signal to each thyristor.

Optionally, the AC input comprises a three-phase input and each thyristor is coupled to a single phase of the AC input. The AC input may comprise a single-phase input or any plurality of phases.

Optionally, deriving the first current comprises measuring a voltage across a shunt resistor.

Optionally, deriving a maximum current demand on the bus comprises retrieving a pre-determined value from a memory associated with the controller or retrieving a value from an external signal.

Optionally, providing a trigger signal comprises retrieving a pre-determined value for a firing angle from a memory associated with the controller or calculating a value for a firing angle.

Preferably, the trigger signal causes the DC bus voltage to rise linearly thereby providing a constant DC bus current.

Optionally, the rectifier circuit further comprises an over-current detection circuit operable to disable each thyristor.

Optionally, the over-current detection circuit comprises a comparator arranged to compare the first current in the DC bus to a pre-determined over-current protection level and to disable the providing of a trigger signal to each thyristor if the first current exceeds the pre-determined over-current protection level.

Optionally, the rectifier is arranged in a half-controlled bridge topology.

Optionally, the rectifier is arranged in a fully-controlled bridge topology.

Optionally, the controller comprises a processor and associated memory.

According to a second aspect there is provided a method of controlling the current in a DC bus as defined in claim 11, the method comprising the steps of deriving a first current in the DC bus, deriving a maximum current demand on the DC bus, and providing a trigger signal to the at least one thyristor based on the derived maximum current and the derived first current.

Optionally, deriving the first current comprises measuring a voltage across a shunt resistor.

Optionally, the method wherein deriving a maximum current demand on the bus comprises retrieving a pre-determined value from a memory associated with the controller or retrieving a value from an external signal.

Optionally, providing a trigger signal comprises retrieving a pre-determined value for a firing angle from a memory or calculating a value for a firing angle.

Preferably, providing a trigger signal causes the DC bus voltage to rise linearly thereby providing a constant DC bus current.

Optionally, the method further comprises the steps of comparing the first current in the DC bus to a pre-determined over-current protection level and disabling the providing of a trigger signal to each thyristor if the first current exceeds the pre-determined over-current protection level.

Optionally, the method wherein providing a trigger signal further comprises the step of comparing the derived maximum current demand with the derived first current.

Optionally, the method wherein if the derived first current is less than the derived maximum current demand, converting the difference in current to a voltage demand signal indicative of a desired change in the DC bus voltage, retrieving a pre-determined firing angle value based on the voltage demand signal, or calculating a firing angle based on the voltage demand signal; and providing an adjusted firing angle to at least one thyristor. If the derived first current is greater than the derived maximum current demand, providing an unchanged firing angle to the at least one thyristor.

Optionally, the step of converting the difference in current to a voltage demand signal further comprises adding the voltage change demand signal to the previous voltage demand signal to obtain a new voltage demand signal, and may also comprise limiting the desired voltage change to a pre-determined voltage change increment before adding the voltage change demand signal to the previous voltage demand signal to obtain a new voltage demand signal.

With all the aspects, optional features are defined in the dependent claims.

BRIEF DESCRIPTION OF THE DRAWINGS

Embodiments will now be described, by way of example only, and with reference to the drawings in which:

FIGS. 1A-1C illustrate signal profiles of known rectifier systems;

FIGS. 2A-2C illustrate signal profiles of a rectifier system according to an embodiment;

In the figures, like elements are indicated by like reference numerals throughout.

OVERVIEW

In view of the aforementioned drawbacks of known systems, it is desired to provide a current profile during the DC bus charge-up with a reduced peak. This can be achieved by controlling the trigger point of thyristors in relation to the phase of the voltage on the AC input. As shown in FIG. 2C, a constant current profile is desired where the peak current is less than the peak of known systems. This results in less stress on the system as a whole, and allows the reduction of the ratings of components. In order to achieve a constant current profile, the DC bus voltage is controlled so that it rises in a linear profile (FIG. 2B). In turn, the linear rise in DC bus voltage during charge-up is achieved by providing thyristor trigger signals of a non-linear profile such as an s-curve profile as shown in FIG. 2A. The bus charge-up time for the profiles of FIGS. 2A, 2B and 2C to be carried out is generally the same as the time for the bus charge-up in known systems having the profiles of FIGS. 1A, 1B, 1C.

The above adjusted trigger signals can be applied to a rectifier having an AC input of any number of phases including single phase and three phase inputs.

The above current profiling is applied during DC bus power/charge up rather than during normal operation. If, however, the DC bus is reduced to below the designed operating condition of the load, the load is removed and the current profiling is reactivated to control the charge up once more.

Additionally, current feedback may be provided to allow the system to adjust to the needs of the circuit on a real time basis. The gradient of the linear voltage profile may be adjusted (by way of adjusting the trigger signals) to cater for current demand of the system during charge-up, for example due to differing DC bus capacitance. Further, the current feedback may also be used to detect and mitigate a circuit failure such as a short circuit or other over-current situation. This detection may take place in advance of any protection fuses blowing which further protects the components of the rectifier and reduces the cost of running such a system.

DETAILED DESCRIPTION

Figure 3:
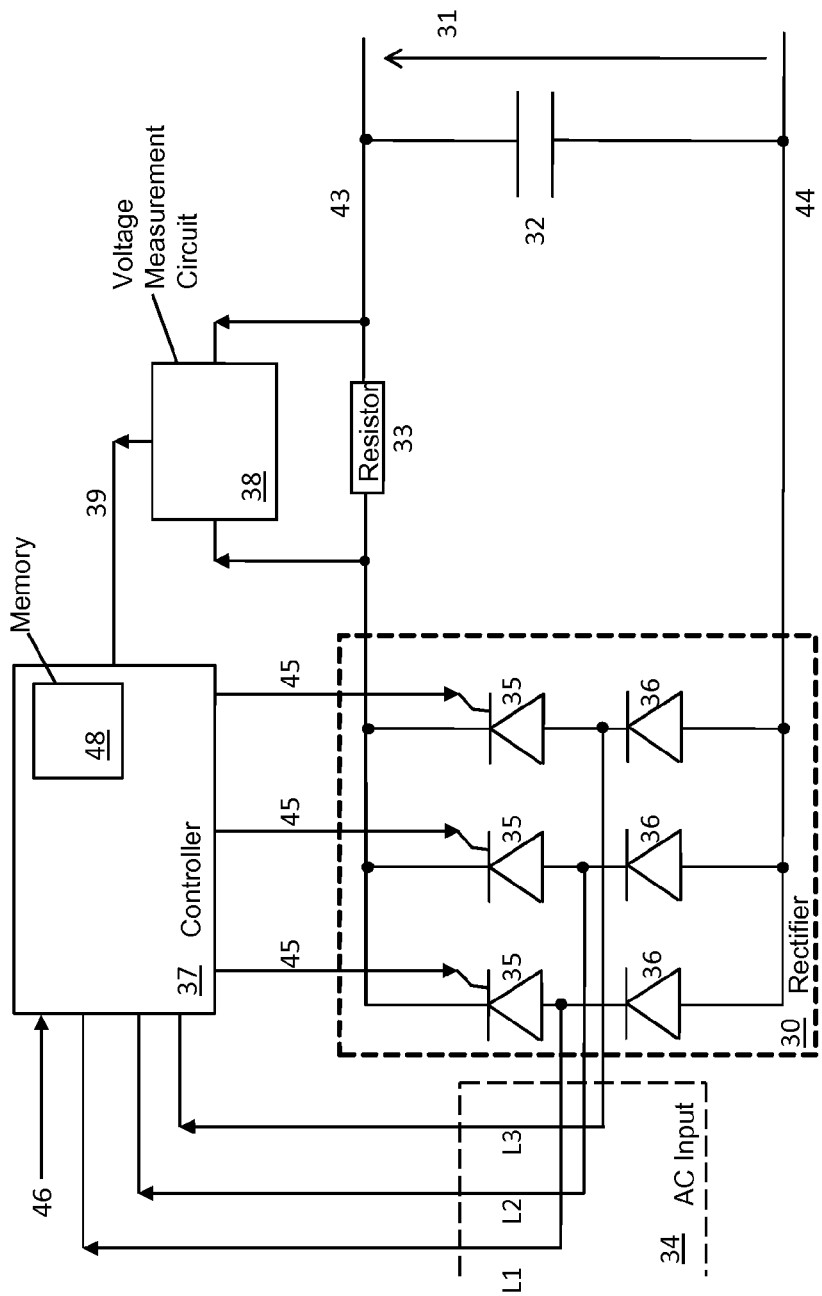
FIG. 3 illustrates a three-phase half-controlled bridge rectifier according to an embodiment.

In the embodiment of FIG. 3, a rectifier 30 is coupled to an AC input 34. In this embodiment the AC input comprises a three-phase input 34 (denoted by L1, L2, L3), however, the AC input may be of any number of phases. The rectifier converts the AC input to a DC output (+Vdc 43, −Vdc 44) as would be understood by the skilled person. The resultant DC bus voltage 31 may drive into a capacitance 32. The capacitance may be fixed or variable.

In this embodiment, rectifier 30 comprises three thyristors 35 and three diodes 36 in a half-controlled bridge rectifier topology. That is to say that half of the bridge of the rectifier comprises thyristors that are controllable, and half of the bridge comprises diodes that are not controllable. Controller 37 is arranged to monitor the three phases of the AC supply 34 as well as a signal 39 indicative of the voltage across a shunt resistor 33. The shunt resistor may be positioned in either the positive Vdc 43 or the negative Vdc line 44. Controller 37 is further arranged to output a trigger signal 45 to at least one thyristor of the rectifier, and preferably a separate trigger signal 45 to each of the thyristors of the rectifier. The controller may control each trigger signal independently or may group together one or more of the trigger signals with the same firing angle.

The controller may be implemented by a microcontroller, an ASIC, an FPGA or any other processor device.

Voltage measurement circuit 38 is arranged to measure the DC voltage at a point either side of shunt resistor 33. Preferably, the shunt resistor has a value of approximately 1.5 m ohms. Any other value of shunt resistor may be used that provides a reliable signal indicative of the voltage across the shunt given the noise generated in the system by switching semiconductor devices etc. The voltage difference across the shunt resistor may be amplified before a signal 39 indicative of the voltage difference across the shunt resistor is passed to controller 37. The use of a shunt resistor provides a quick and efficient manner of measuring a signal (voltage across the shunt) from which a DC bus current value is easily derivable.

Figure 6:
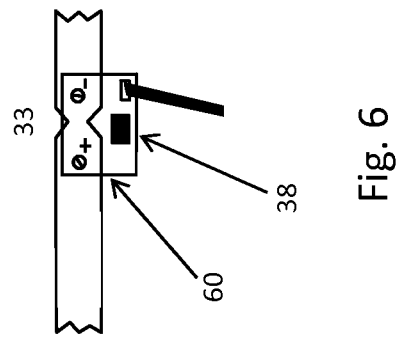
FIG. 6 illustrates an arrangement of the shunt voltage circuit in position according to an embodiment.
Figure 5:
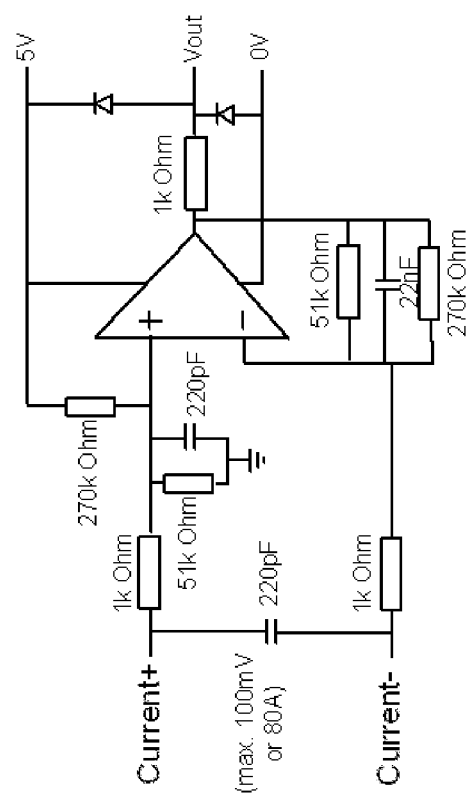
FIG. 5 illustrates a voltage measurement circuit according to an embodiment.

FIG. 5 illustrates a circuit suitable for providing the functionality of voltage measurement circuit 38 across a shunt resistor as would be understood by the skilled person. The circuit of FIG. 5 requires a separate 5 v DC supply and is rated at 100 mV across the shunt resistor which equates to a DC bus current of 80 A. A 250 A version of the circuit of FIG. 5 would utilise 12 k Ohm resistors instead of 51 k Ohm resistors. To reduce the effect of noise in the system on the relatively small voltage value measured, the measurement of the shunt voltage is preferably amplified close to the shunt resistor. FIG. 6 shows an arrangement where an optional circuit board 60 is positioned either side of the shunt resistor with contact points provided by two screws as illustrated. Other forms of contact either side of the shunt resistor may be used such as soldering, push fit, snap fit or flying leads. The voltage measurement circuit 38 may be positioned on the circuit board 60. To remove any offsets from the system, the 'zero' current i.e. the current that is flowing due to leakage and parasitic components in the DC bus even before the bus has begun to charge can be measured and removed from subsequent calculations.

Figure 4:
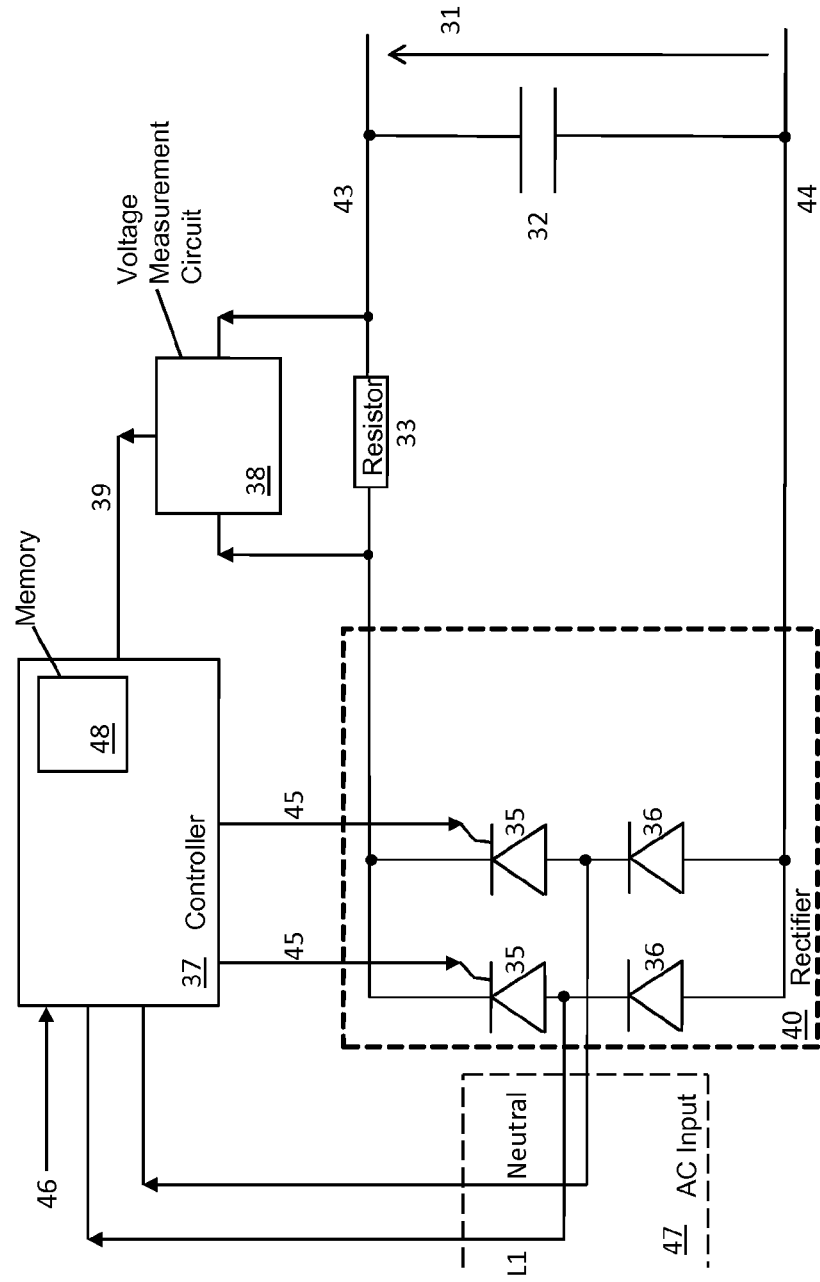
FIG. 4 illustrates a single-phase half-controlled bridge rectifier according to an embodiment.

FIG. 4 shows a single-phase AC input 47 (denoted by L1, Neutral). In this embodiment, rectifier 40 comprises two thyristors 35 in a half-controlled bridge topology.

A fully-controlled bridge topology (each element of the rectifier comprising a thyristor) may also be used with rectifiers according to embodiments. In these embodiments, the controller comprises additional trigger signal outputs according to the number of thyristors. The thyristors that replace the diodes of a half-controlled bridge topology in a full-controlled bridge topology allow the transfer of current from the DC bus capacitance to the AC supply. This may be required where the load on the DC bus is a regenerative load and is transferring current into the DC bus capacitance, for example a retarding load where the dc bus is converted using an inverter. However, operation of the rectifier during DC bus charge-up is the same whereby the thyristors that replace diodes would have their firing angle at a constant fully phase forward such that they operate in an equivalent manner to diodes of a half-controlled topology. When an AC waveform is present on the AC input 34, 40, the AC input is monitored by the controller as exemplified in FIGS. 3 and 4. The controller provides a trigger signal 45 having a phase angle (a firing angle) relative to the phase of the voltage of the AC input to the respective thyristor. The phasing of the trigger signal(s) follows an s-curve profile as shown in FIG. 2A. This profile is pre-determined to provide a linear rise in the DC bus voltage. Each subsequent firing angle may be provided by retrieving a value from a look-up table in a memory 48 associated with the controller 37. By stepping through the look-up table in a sequential manner, the desired s-curve firing angle profile may be obtained. Alternatively, each firing angle may be calculated on the fly by controller 37 to achieve the same s-curve profile. The firing angles provided to each thyristor result in the DC bus voltage 31 ramping up in a linear manner as shown in FIG. 2B. This, in turn, provides a current profile control as shown in FIG. 2C. The current follows a flat and constant value. This provides a lower peak value of current than known systems. Components of the system may be rated to lower values than known systems as the peak signal levels are lower. For example, fuses may be of a lower rating, and the system as a whole undergoes less stress during DC bus charge-up.

As well as monitoring the AC input lines and providing the at least one thyristor trigger signal, the controller 37 also monitors the current flowing in the DC bus by way of shunt resistor 33 and voltage measuring circuit 38. A signal (39) indicative of the voltage across the shunt resistor is provided to the controller where the current through the shunt resistor is derived and hence the current flowing in the DC bus. The purpose of monitoring the current in the DC bus is to provide feedback which allows the thyristor trigger signal(s) 35 to be adjusted on the fly to cater for immediate circuit conditions. Adjusting the trigger signals 35 comprises adjusting (preferably increasing) the firing angle of a particular thyristor in relation to the phase of the respective voltage input to that thyristor. The firing angle is increased, and the appropriate trigger signal 35 is issued by the controller 37. The current in the DC bus is then derived from signal 39 (from the voltage measurement circuit 38) so that the effect on the DC bus current resulting from the last increase in the firing angle can be deduced. If the current in the DC bus is too large (i.e. the derived current 79 of the DC bus is greater than the maximum current demand 46 of the load on the DC bus—see explanation later), the next increment of the firing angle is set to zero to reduce the gradient of the linear voltage waveform (the rate of change of the voltage). This, in turn, reduces the current in the DC bus which reduces the charge rate across the bus capacitance 32 as the skilled person would understand.

Adjusting the trigger signals has the effect of adjusting the gradient of the linear voltage ramp of the DC bus which, in turn, limits the current to a predetermined charging level to enable a range of capacitances (as appear across the rectifier outputs 43, 44) to be connected to the DC bus. The range of capacitances may be in the form of parallel modules of capacitors, or an external capacitor bank for flying shear applications, for example.

Figure 7:
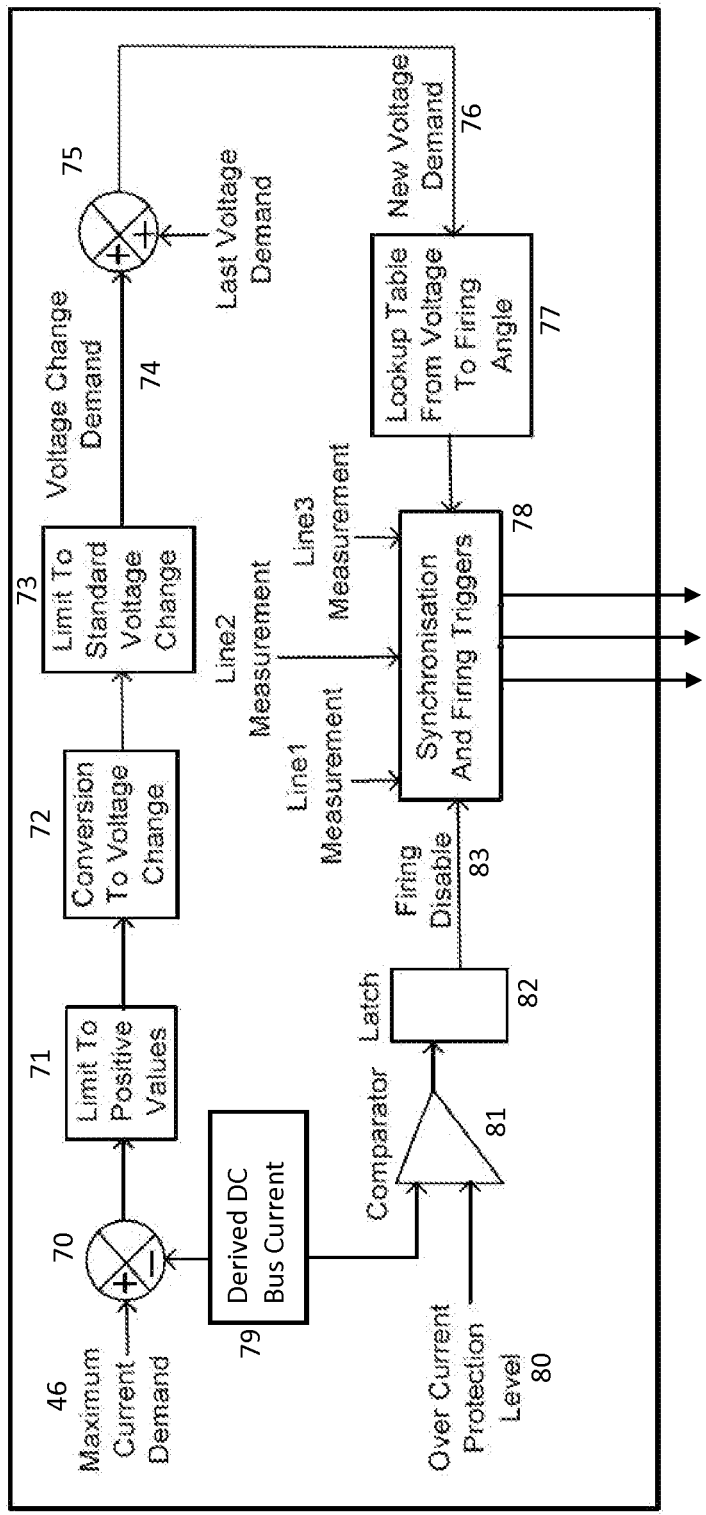
FIG. 7 illustrates a flow diagram of the controller according to an embodiment.

Further details of the operation of controller 37 will now be described with reference to FIG. 7. The flow diagram of FIG. 7 may be implemented in software and executed on a processor, or hardwired into a programmable logic device such as an FPGA or an ASIC. As described previously, controller 37 monitors the AC input 34, 41 and the signal indicative of the voltage across the shunt resistor 39, which, in turn, is used by the controller to derive the current in the DC bus (79 of FIG. 7) while the bus is charging up. The maximum current demand 46 of the load of the system coupled to the DC bus in which the rectifier 30, 40 resides is also used by the controller. The maximum current demand may be specific to the system in which the rectifier resides (chosen specifically for the system and its components), or may be varied by way of an external input (by way of the optional input signal 46 in FIGS. 3 and 4). It may be desired to alter the maximum current demand for the system to a lower value if, for example, the user is aware that the AC power supply in which the rectifier circuit resides is incapable of supplying the levels of current required by the load during DC bus charge-up. As seen at 70, the derived DC bus current is subtracted from the maximum current demand value. This occurs once per every zero-crossing point of the voltage phase of the AC input of each thyristor (once per cycle).

If the resultant value of subtractor 70 is negative, i.e. the maximum current demand 46 of the load is less than the derived DC bus current. Element 71 adjusts this value to zero. Elements 72 and 73 pass through zero values so that the voltage change demand signal 74 is also zero. With a zero voltage change demand 74, the new voltage demand signal 76 is unchanged from the previous voltage demand. In this event, the previous pre-determined value from the lookup table is retrieved again. The firing angle therefore remains constant and the thyristor trigger signal(s) 35 are also unchanged. This results in the gradient of the DC bus voltage waveform being reduced to zero for the present cycle. With a reduced gradient, the DC bus current is reduced as would be understood by the skilled person. The DC bus current may be reduced as the needs of the load are met (the derived current is more than the maximum current demand of the present load), therefore, current provided by the rectifier can be reduced to lower the strain in the system.

Element 78 also synchronises the trigger signals with the voltage phase of the AC input as would be understood by the skilled person.

If the resultant value of subtractor 70 is positive, i.e. the maximum current demand 46 of the load is greater than the derived DC bus current, then flow continues to element 72 where the positive current value is converted to a desired voltage change in the DC bus voltage based on the properties such as the rectifier circuit, the DC bus parasitics, DC bus capacitance and DC bus inductance as would be understood by the skilled person. This may result in a change in the gradient of the DC bus voltage ramp-up depending on whether the desired change is limited to a pre-determined standard voltage change value by element 73. This standard voltage change value may be retrieved from a memory associated with the controller. The standard voltage change value is used to limit the desired voltage change demand (based on the derived DC bus current) in order to avoid the DC bus voltage waveform gradient changing by too high a positive value which could increase the DC bus current to too high a level. The voltage change demand signal 74 is, therefore, either the value as calculated if the voltage change is below the standard voltage change value, or the standard value if this value is used to limit the desired voltage change.

At element 75, the new voltage change demand signal 74 is added to the previous voltage demand signal to produce a new voltage demand signal 76. Flow then continues at element 77 where the appropriate firing angle is retrieved based on the new voltage demand signal 76. In this instance, the retrieved firing angle may result in a modified s-curve profile to produce a desired current level in the DC bus by way of modifying the gradient of the DC bus voltage waveform (if a voltage change demand less than the standard value 73 is used). In effect, the standard s-curve profile of firing angles is scaled by the new voltage demand signal 76.

From the above, it is seen how initially, an s-curve firing angle profile of the thyristors of a rectifier is used to provide a linear voltage gradient which, in turn, produces a constant DC bus current. A derived DC bus current is used to modify subsequent firing angles to cater for circuit conditions such as changing capacitance into which the DC bus is charging.

Alternatively, instead of a look-up table containing pre-determined values for the firing angle based on the new voltage demand signal 76 at element 77, the firing angles for the trigger signals 35 may be calculated on the fly based on the desired s-curve profile of the firing angles.

In addition to the firing angle control, the controller 37 may also be arranged to provide over-current protection, for example in the case of a short circuit across the DC bus 43, 44. For each system within which the rectifier 30, 40 resides, an over-current protection level 80 may be pre-determined and stored in a memory associated with the controller 37. This level 80 may be compared 81 to each instance of derived DC bus current 79 as described previously. Should the derived DC bus current increase to a level greater than the over-current protection level 82 then a firing disable signal may be issued by the controller which halts the output of all thyristor trigger signals 35. In this event, all thyristor signals are disabled so that the rectifier would be switched off by the time the next zero crossing point of the voltage phase has occurred as would be understood by the skilled person. The use of a shunt resistor for deriving the DC bus current as previously described allows simple and efficient comparison with the over-current protection level 80.

The Controller may also comprise output signals to signify that the DC bus charging cycle is complete and that an over-current protection situation has occurred.

The controller may also store any values either calculated or retrieved from an associated memory during the course of operation in a data log to enable circuit conditions and variables to be reviewed at a later time. This can aid the development of the various look-up tables or calculation algorithms employed and help to tailor the charge control system for situation within which the rectifier is operating. Wherever the term 'associated memory' is used in this specification, the memory may be internal or external to the controller 37.

Thus there is provided DC bus charging current control implemented by advancing the thyristor firing angle based on a profile aimed at providing a limited constant current which in turn limits the charging level to enable a range of capacitor values to be connected to the DC bus. A separate trip current level (over-current level) may be provided to protect the rectifier circuit from low impedance loads and shorts across the DC bus.

The invention claimed is:

1. A rectifier circuit comprising:
an AC input;
at least one thyristor coupled to the AC input, the at least one thyristor arranged to drive a DC bus; and
a controller arranged to:
derive a first current in the DC bus;
derive a maximum current demand on the DC bus; and
provide a trigger signal to the at least one thyristor based on a comparison between the derived maximum current demand and the derived first current,
wherein if the derived first current is less than the derived maximum current demand, the controller is arranged to:
convert a difference in current between the derived first current and the derived maximum current demand to a voltage demand signal indicative of a desired change in a DC bus voltage,
retrieve a pre-determined firing angle value based on the voltage demand signal, or calculate a firing angle based on the voltage demand signal, and
provide an adjusted firing angle to the at least one thyristor; and
wherein if the derived first current is greater than the derived maximum current demand, the controller is arranged to:
provide an unchanged firing angle to the at least one thyristor.

2. The rectifier circuit of claim 1 wherein the trigger signal comprises a firing angle in relation to a voltage phase of the AC input.

3. The rectifier circuit of claim 2 wherein the controller is arranged to derive the maximum current demand on the DC bus from an external signal.

4. The rectifier circuit of claim 2 wherein the controller is arranged to retrieve the pre-determined firing angle value from a memory associated with the controller.

5. The rectifier circuit of claim 2 wherein the controller is arranged to calculate the firing angle based on the voltage demand signal.

6. The rectifier circuit of claim 1 further comprising a plurality of thyristors coupled to the AC input and arranged to drive the DC bus, the plurality of thyristors including the at least one thyristor, and wherein the controller is arranged to provide a trigger signal to each thyristor.

7. The rectifier circuit of claim 6 wherein the AC input comprises a three-phase input.

8. The rectifier circuit of claim 7 wherein each thyristor is coupled to a single phase of the AC input.

9. The rectifier circuit of claim 1 wherein the controller is arranged to derive the first current based on a measured voltage across a shunt resistor.

10. The rectifier circuit of claim 1 wherein the controller is arranged to derive the maximum current demand on the DC bus based on a pre-determined value from a memory associated with the controller.

11. The rectifier circuit of claim 1 whereby the trigger signal causes the DC bus voltage to rise linearly thereby providing a constant DC bus current.

12. The rectifier circuit of claim 1 further comprising an over-current detection circuit operable to disable each thyristor.

13. The rectifier circuit of claim 12 wherein the over-current detection circuit comprises a comparator arranged to compare the first current in the DC bus to a pre-determined over-current protection level and to disable the trigger signal to the at least one thyristor if the first current exceeds the pre-determined over-current protection level.

14. A method of controlling the current in a DC bus driven by a rectifier circuit comprising at least one thyristor coupled to an AC input and arranged to drive the DC bus, the method comprising the steps of:

deriving a first current in the DC bus;

deriving a maximum current demand on the DC bus;

providing a trigger signal to the at least one thyristor based on a comparison between the derived maximum current demand and the derived first current;

wherein if the derived first current is less than the derived maximum current demand:

converting a difference in current between the derived first current and the derived maximum current demand to a voltage demand signal indicative of a desired change in a DC bus voltage, retrieving a pre-determined firing angle value based on the voltage demand signal, or calculating a firing angle based on the voltage demand signal, and providing an adjusted firing angle to the at least one thyristor; and wherein if the derived first current is greater than the derived maximum current demand:

providing an unchanged firing angle to the at least one thyristor.

15. The method of claim 14 wherein the trigger signal comprises a firing angle in relation to a voltage phase of the AC input.

16. The method of claim 14 wherein the rectifier circuit comprises a plurality of thyristors coupled to the AC input and arranged to drive the DC bus, wherein the plurality of thyristors includes the at least one thyristor, and wherein a trigger signal is provided to each thyristor.

17. The method of claim 14 wherein the AC input comprises a three-phase input and wherein each thyristor is coupled to a single phase of the AC input.

18. The method of claim 14 wherein deriving the first current comprises measuring a voltage across a shunt resistor.

19. The method of claim 14 wherein deriving a maximum current demand on the bus comprises retrieving a pre-determined value from a memory associated with the controller, or retrieving a value from an external signal.

20. The method of claim 14 wherein retrieving includes retrieving a pre-determined firing angle value from a memory.

21. The method of claim 14 whereby providing a trigger signal causes the DC bus voltage to rise linearly thereby providing a constant DC bus current.

22. The method of claim 14 further comprising the steps of comparing the first current in the DC bus to a pre-determined over-current protection level and disabling the providing of a trigger signal to each thyristor if the first current exceeds the pre-determined over-current protection level.

23. The method of claim 14 wherein the step of converting the difference in current to a voltage demand signal further comprises adding the voltage demand signal to a previous voltage demand signal to obtain a new voltage demand signal.

24. The method of claim 23 further comprising limiting the desired change in the DC bus voltage to a pre-determined voltage change increment before adding the voltage demand signal to the previous voltage demand signal to obtain a new voltage demand signal.

* * * * *